R. A. MARSHALL.
APPARATUS FOR PRODUCING BUTTER.
APPLICATION FILED MAR. 17, 1910.

979,524.

Patented Dec. 27, 1910.

3 SHEETS—SHEET 1.

Witnesses

Inventor
R. A. Marshall
By
Attorneys

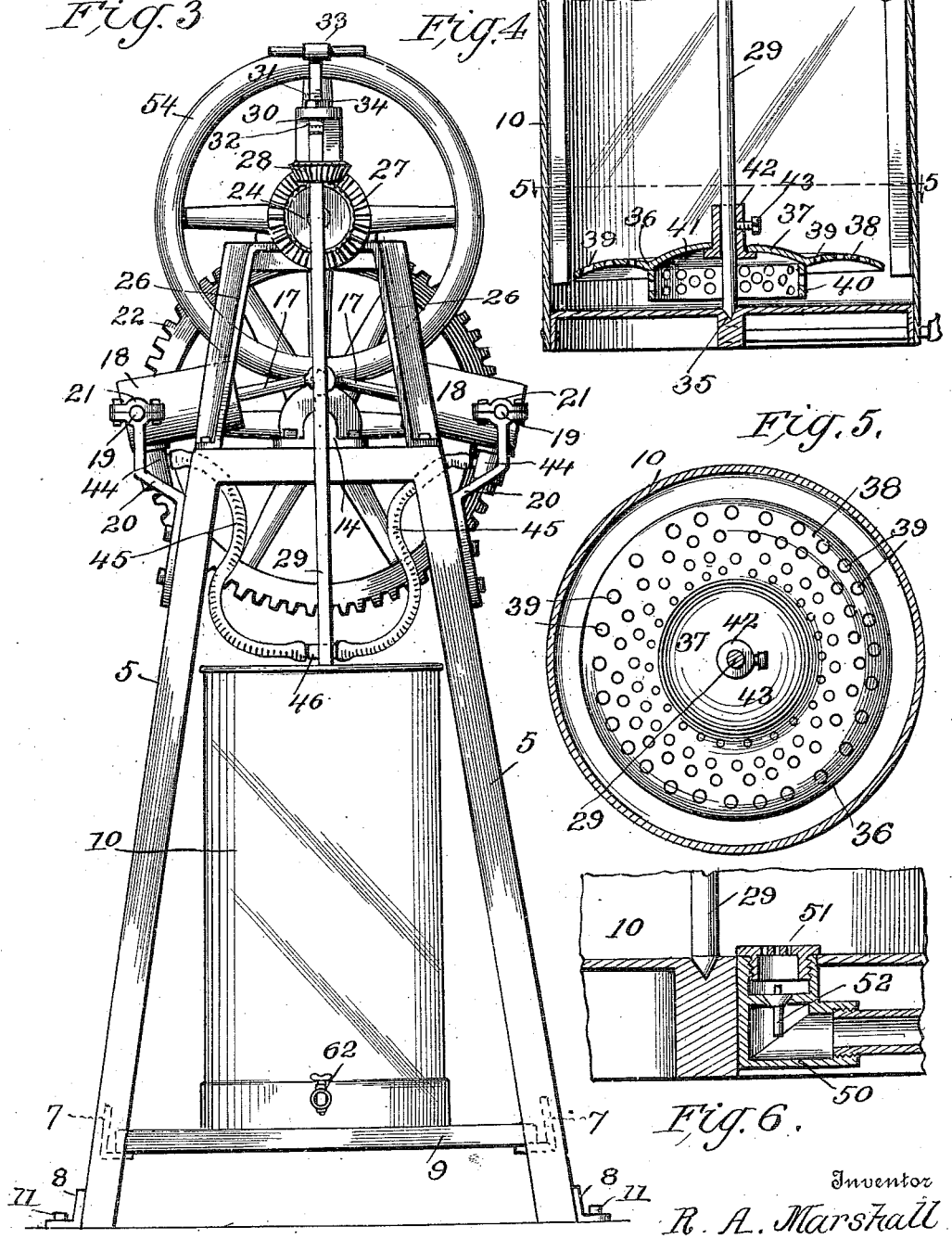

R. A. MARSHALL.
APPARATUS FOR PRODUCING BUTTER.
APPLICATION FILED MAR. 17, 1910.
979,524.
Patented Dec. 27, 1910.
3 SHEETS—SHEET 3.
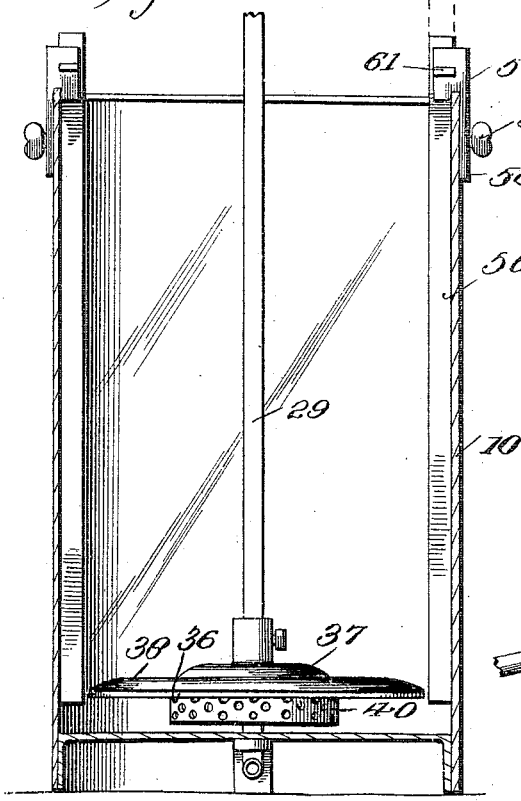
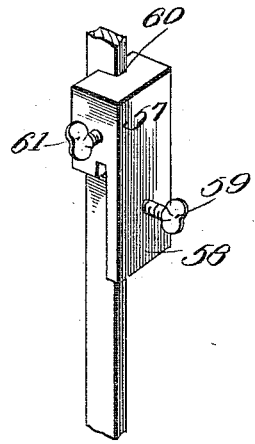
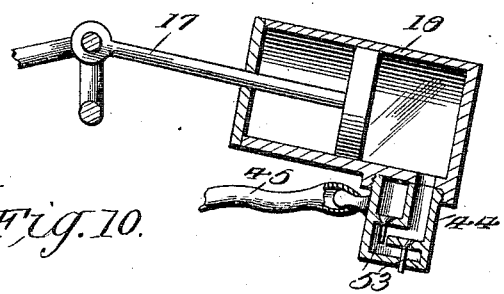
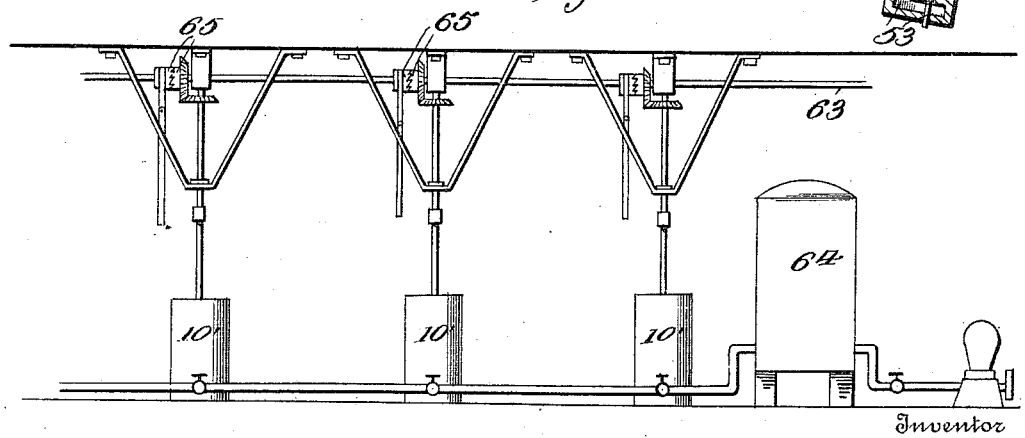
Witnesses
Inventor
R. A. Marshall
By ——, Attorneys

UNITED STATES PATENT OFFICE.

RUSSELL A. MARSHALL, OF SOMERSET, PENNSYLVANIA.

APPARATUS FOR PRODUCING BUTTER.

979,524.     Specification of Letters Patent.     Patented Dec. 27, 1910.

Application filed March 17, 1910. Serial No. 549,937.

*To all whom it may concern:*

Be it known that I, RUSSELL A. MARSHALL, citizen of the United States, residing at Somerset, in the county of Somerset and State of Pennsylvania, have invented certain new and useful Improvements in Apparatus for Producing Butter, of which the following is a specification.

This invention relates to apparatus for producing butter.

The object of the invention is to provide an apparatus of simple and compact construction by means of which a better grade of butter can be produced in less time and with less labor on the part of the operator than heretofore.

A further object is to provide an apparatus in which the separation of the butter fat from the liquid matter is effected by mechanically agitating the cream or milk and simultaneously subjecting the cream to the action of a jet or current of air.

A further object is to provide means for forcing air upwardly through the bottom of the liquid receiving vessel, and means for insuring a uniform diffusion of air through the milk or cream in said vessel, thus to purify the liquid and cause the cream globules to collect at the top of the vessel.

A further object is to provide an air distributing disk or member mounted for rotation within the liquid receiving vessel and which serves the dual function of agitating the cream and diffusing the air upwardly through the body thereof.

A further object is to provide the liquid receiving vessel with a plurality of vertically adjustable blades which retard the rotary movement of the liquid and thus break the cream and accelerate the churning operation.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

Figure 1:
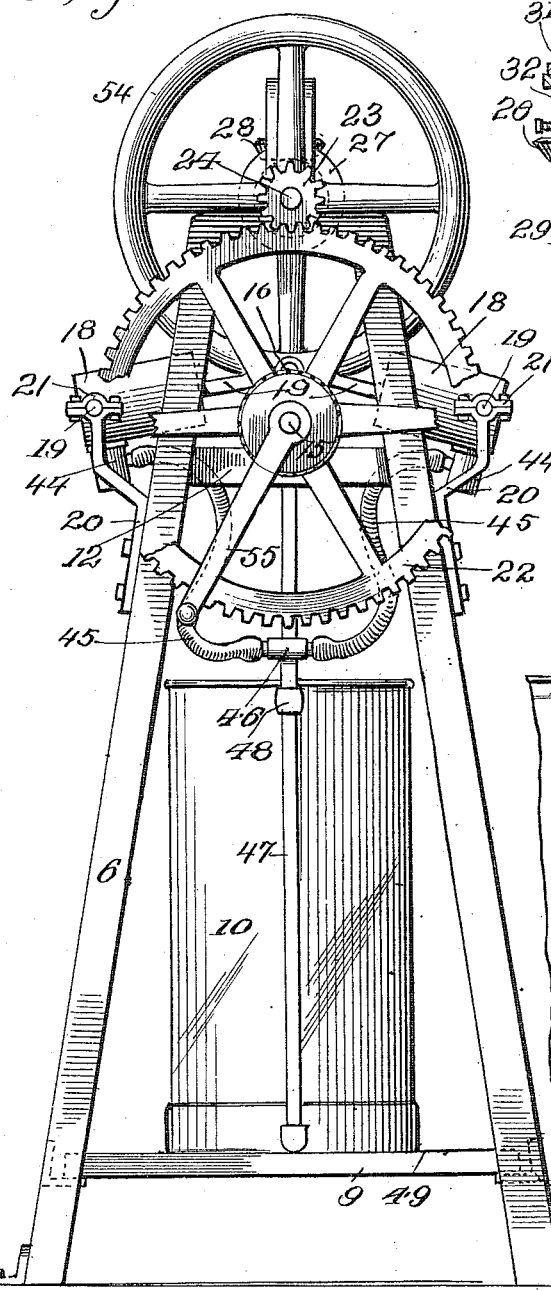
Figure 2:
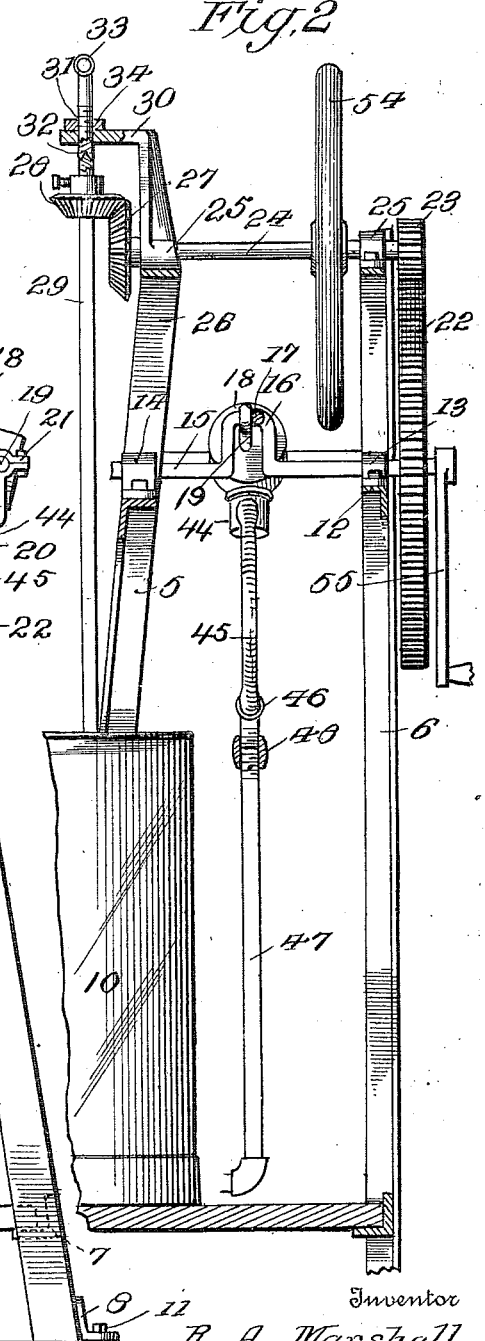

For a full understanding of the invention and the merits thereof, reference is to be had to the following description and accompanying drawings, in which:

Figure 1 is a rear elevation of a butter producing apparatus constructed in accordance with my invention; Fig. 2 is a vertical sectional view of the same; Fig. 3 is a front elevation; Fig. 4 is a detail vertical sectional view of the spreader or air distributing member; Fig. 5 is a transverse sectional view taken on the line 5—5 of Fig. 4 and looking in the direction of the arrow; Fig. 6 is a detail vertical sectional view of the lower portion of the liquid receiving vessel showing the construction of the inlet valve; Fig. 7 is a vertical sectional view of the liquid receiving vessel with the retarding blades in position thereon, the distributing member or spreader being shown in elevation; Fig. 8 is a detail perspective view of one of the clips for supporting the liquid retarding blades within the vessel; Fig. 9 is a vertical sectional view of one of the air pumps showing the construction of the valves; Fig. 10 is a side elevation showing a gang of producers operated from a common line shaft.

Corresponding and like parts are referred to in the following description and indicated in all the views of the drawings by the same reference characters.

The butter producing apparatus forming the subject matter of the present invention comprises a supporting frame including front and rear inverted U-shaped members 5 and 6 preferably formed of angle iron and of different heights, as shown, said members having their lower ends connected by spaced longitudinal bars 7 and 8, also preferably formed of angle iron.

The flanges of the upper angle irons 7 are extended inwardly to form a support for a table or platform 9, upon which is mounted a liquid receiving tank or vessel 10, while the flanges of the lower angle irons 8 are extended outwardly and provided with perforations for the reception of screws or similar fastening devices 11 by means of which the frame may be secured to a floor or other suitable support.

The rear member or frame 6 is provided with a transverse brace 12 to which is secured a bearing 13, there being a similar bearing 14 on the upper end of the front member 5. Journaled in the bearings 13 and 14 is a driving shaft 15 having its intermediate portion offset to form a crank 16 to which are connected the piston rods 17 of a pair of air oscillating pumps 18. The cylinders of the air pumps 18 are provided with laterally extending trunnions 19, which latter are journaled in suitable supporting brackets 20 fastened to the front and rear supporting members 5 and 6, as best shown in Fig. 3 of the drawings. The lower ends of the brackets 20 are bolted or otherwise rigidly secured to the adjacent supporting members 5 and 6, while the upper ends thereof are offset and provided with detachable cap pieces 21 so as to permit the ready insertion or removal of the trunnions 19.

One end of the driving shaft 15 is projected longitudinally beyond the rear supporting member 6 to form a support for a master gear 22, which latter meshes with a pinion 23 keyed or otherwise secured to a stub shaft 24. The stub shaft 24 is journaled in suitable bearings 25 carried by the rear frame 6 and an auxiliary frame 26 mounted on the upper end of the front supporting member 5. Secured to the stub shaft 24, is a bevel gear 27 which meshes with a bevel pinion 28 keyed to a vertically disposed shaft 29. The auxiliary frame 26 is provided with an overhanging arm 30 having a threaded opening formed therein and adapted to receive a correspondingly threaded pin 31. The lower end of the pin 31 is provided with a cone bearing 32 adapted to receive the adjacent end of the vertical shaft 29, while the upper end of the pin is provided with a finger piece 33 by means of which the pin may be rotated so as to take up any wear on the bearing, there being a clamping nut 34 engaging the threads on the pin and bearing against the overhanging arm 30 for holding the pin in adjusted position. The lower end of the shaft 29 extends within the liquid receiving vessel 10 and is provided with a pointed terminal which engages a bearing 35 formed in the bottom of said vessel, thus to permit rotation of the shaft without undue friction between the parts.

Mounted on the shaft 29 is a distributing member or disk 36 which serves to mechanically agitate the milk or cream within the vessel 10 and thus accelerate the churning operation. The distributing member 36 is provided with a concavo-convex central portion 37 and a downwardly inclined flange 38 having perforations 39 formed therein and gradually increasing in size from the central portion 37 to the outer edge of the flange 38 so as to cause a uniform diffusion of air throughout the body of the milk or cream in the receiving vessel 10.

Depending from the solid concavo-convex portion 37 of the distributing member, is a perforated flange 40 which serves to partially confine the air in the chamber 41, the air being directed through the perforations in the flanges 40 and 38 upwardly through the body of cream, as before stated. The distributing member is secured to a collar 42 which in turn is slidably mounted on the shaft 29 so as to permit the distributing member to be raised or lowered, as desired, said collar being locked in adjusted position by means of a set screw or similar fastening device 43.

Depending from the rear end of each pump cylinder 18 is a valve casing 44 to which is connected a flexible tube or conductor 45, said conductors being extended inwardly and fastened in any suitable manner to a T-coupling 46 disposed at the rear of the liquid receiving vessel 10. The member 46 is detachably connected to the upper end of a pipe 47 by a threaded sleeve or coupling 48, the lower end of the pipe 47 being extended through a flange 49 on the vessel 10 for connection with a valve casing 50. The valve casing 50 is secured to the bottom of the vessel 10 and is provided with a perforated cap 51 by removing which, access may be had to the check valve 52 for the purpose of cleaning or repairing the same.

Disposed within the valve casings 44 of the pumps are check valves 53, one of which operates to admit air to the interior of the pump on the suction stroke of the piston, while the other permits the passage of air through the adjacent conductor 45 and perforated cap 51 to the interior of the liquid receiving vessel on the compression stroke of the piston.

A balance wheel 54 is secured to the stub shaft 24, while the driving shaft 15 is provided with a crank 55, by rotating which, motion may be imparted to the shaft 29 through the medium of the gearing and the pumps 18 simultaneously actuated to force air through the body of milk or cream in the receiving vessel. If desired however, a belt pulley may be secured to the driving shaft 15 and connected through the medium of a belt with a motor or other suitable source of power. Thus it will be seen that as the shaft 29 revolves, the distributing member 36 will impart a rotary movement to the cream or milk in the vessel 10 so as to mechanically agitate the same, air being simultaneously admitted through the perforated cap 51 and uniformly diffused through the body of liquid by means of the member 36, thus to purify the cream and cause the butter fat to collect at the top of the vessel.

As a means for retarding the rotary movement of the liquid in the receiving vessel, there are provided a plurality of blades 56 which tend to break the cream and thus accelerate the churning operation. The retarding blades 56 are suspended within the liquid receiving vessel 10 by means of suitable clips 57, each provided with a depending finger 58 which bears against the outer wall of the vessel 10 and is retained in position thereon by a clamping screw 59.

The inner face of each clip is provided with a vertical guiding groove 60 for the reception of the adjacent retarding blade 56 so that by raising or lowering the blades 56 in the guiding grooves 60 and rotating the clamping screws 61, the blades may be adjusted vertically of the vessel according to the quantity of cream or milk therein.

In operation the retarding blades 56 and distributing member 36 are adjusted vertically of the receiving vessel according to the quantity of liquid contained therein. The driving shaft 15 is then rotated either manually or by means of a motor so as to transmit motion to the distributing member 36 and actuate the pumps to force a jet of air through the bottom of the vessel 10, the air being uniformly diffused through the entire body of milk or cream in the vessel 10, while agitated by the member 36 and retarding blades 56. As the air is forced through the body of liquid in the vessel 10, the cream globules and butter fat will collect at the top of the vessel, the buttermilk being subsequently drawn off through a drain pipe 62 extending laterally from the bottom of the vessel 10. After the buttermilk has been drawn off in the manner described, the butter in the vessel 10 is subjected to the usual washing operation, as will be readily understood.

In Fig. 10 of the drawings, there is illustrated a modified form of the invention, in which a gang of liquid receiving vessels 10' are driven from a common line shaft 63, air being supplied to the vessels 10' from a suitable reservoir 64. Mating clutch members 65 are disposed on the line shaft 63 above each liquid receiving tank 10' so that any particular apparatus may be thrown into and out of action to the exclusion of the others.

The device shown in Fig. 10 of the drawings is principally designed for use in creameries and similar plants where the manufacture of butter is conducted on a large scale. It will of course be understood that the flanges 39 of the air distributing member may be either concavo-convex or flat in cross section, and that any number of retarding blades may be employed, without departing from the spirit of the invention. It will also be understood that the size and shape of the supporting frame and its associated parts may be varied at will.

Having thus described the invention, what is claimed as new is:

1. In an apparatus of the class described, a liquid receiving vessel, a concavo-convex distributing member mounted for rotation within the vessel and having its central portion solid and provided with an air chamber and its outer portion provided with perforations gradually decreasing in size from the outer edge of said member to the solid portion thereof, and means for forcing air upwardly through the perforations in said distributing member.

2. In an apparatus of the class described, a liquid receiving vessel, a distributing member mounted for rotation within the vessel and having its intermediate portion solid and of concavo-convex formation to produce an air chamber and its outer portion perforated, a perforated flange depending from the solid concavo-convex portion of the distributing member, and means for forcing air upwardly within the chamber and laterally through the perforations in the flange and outer edge of the distributing member.

3. In an apparatus of the class described, a liquid receiving vessel, a plurality of vertically adjustable retarding blades suspended within the vessel, a distributing member mounted for rotation within said vessel and provided with a depending perforated flange, and means for forcing air upwardly through the bottom of the vessel and laterally through the perforations in the flange.

4. In an apparatus of the class described, a liquid receiving vessel, a vertical shaft mounted for rotation within the vessel, a distributing member carried by and adjustable vertically of the shaft and having its central portion solid and concavo-convex in cross-section to produce an air chamber and its outer edge provided with an annular perforated flange, a perforated flange depending from the solid portion of the distributing member at said chamber, means for forcing air through the bottom of the vessel into said chamber and thence through the perforations in said flanges, and means for holding the distributing member in adjusted position on the shaft.

5. In an apparatus of the class described, a liquid receiving vessel, a vertical shaft mounted for rotation within the liquid receiving vessel, an air distributing member secured to the vertical shaft, a driving shaft, means for transmitting motion from the driving shaft to the vertical shaft, co-acting pumps operatively connected with and actuated by the driving shaft, flexible conductors connected with the pumps, a T-coupling forming a connection between the flexible conductors, a pipe having one end thereof provided with a vertical extension and its other end communicating with the interior of the liquid vessel for forcing air upwardly through the bottom of the vessel to the distributing member, and means for connecting the T-coupling to said extension.

6. In an apparatus of the class described, a liquid receiving vessel, a vertical shaft mounted for rotation within the vessel, an air distributing member secured to the vertical shaft, a driving shaft having a crank, oscillating air pumps disposed on opposite sides of the driving shaft, pistons operating within the pumps and connected to the crank of the driving shaft, means for transmitting motion from the driving shaft to the vertical shaft, a pipe having one end thereof communicating with the interior of the liquid receiving vessel for forcing air upwardly through the bottom of said vessel and beneath the distributing member and having its opposite end provided with a vertical extension, flexible conductors connecting the pumps, and means for detachably connecting the flexible conductors with the extension of said pipe.

7. In an apparatus of the class described, a supporting frame, a liquid receiving vessel mounted on the frame, a vertical shaft mounted for rotation within the vessel, an air distributing disk secured to and mounted for rotation with the vertical shaft, a valve casing secured to the bottom of the vessel beneath the distributing disk, a valve operating within the casing, a perforated cap forming a closure for the upper end of the valve casing, a driving shaft, means for transmitting motion from the driving shaft to the vertical shaft for forcing air upwardly through the perforations in said cap and through the body of liquid contained in said vessel.

8. In an apparatus of the class described, a supporting frame including front and rear members, a platform forming a part of the frame, a liquid receiving vessel mounted on the platform, a driving shaft journaled on the front and rear members of the supporting frame, an auxiliary frame secured to the front member of the supporting frame, a stub shaft journaled in the rear supporting frame and said auxiliary frame and provided with a bevel gear, a vertical shaft mounted for rotation in the liquid receiving vessel and provided with a bevel pinion meshing with the bevel gear, a master gear secured to the driving shaft, a pinion secured to the stub shaft and meshing with the master gear, pumps mounted for oscillation on the supporting frame and operable from the driving shaft for forcing air upwardly through the body of liquid contained therein.

9. In an apparatus of the class described, a supporting frame, a platform secured to the frame, a liquid receiving vessel mounted on the platform, a vertical shaft mounted for rotation in the liquid receiving vessel, brackets secured to the supporting frame and provided with bearings, pump cylinders having trunnions mounted in said bearings, a driving shaft, means for transmitting motion from the driving shaft to the vertical shaft, means for operating the pumps from said driving shaft, and means operatively connected with the pipe for forcing air upwardly through the body of liquid contained therein.

10. In an apparatus of the class described, a liquid receiving vessel, a vertical shaft mounted for rotation within the vessel, a perforated distributing member carried by the vertical shaft, clips having transversely seating recesses for the reception of the upper edge of the vessel and provided with vertical guiding grooves, retarding blades mounted for vertical movement in said grooves, means piercing the clips for clamping the retarding blades in adjusted position, and means for forcing air through the bottom of the liquid vessel beneath the perforated distributing member.

In testimony whereof, I affix my signature in presence of two witnesses.

RUSSELL A. MARSHALL. [L. S.]

Witnesses:
W. N. WOODSON,
SAMUEL W. ACKER.